March 28, 1939.  C. LORENZ ET AL  2,152,596
WELDING APPARATUS
Filed Nov. 8, 1937  5 Sheets-Sheet 1
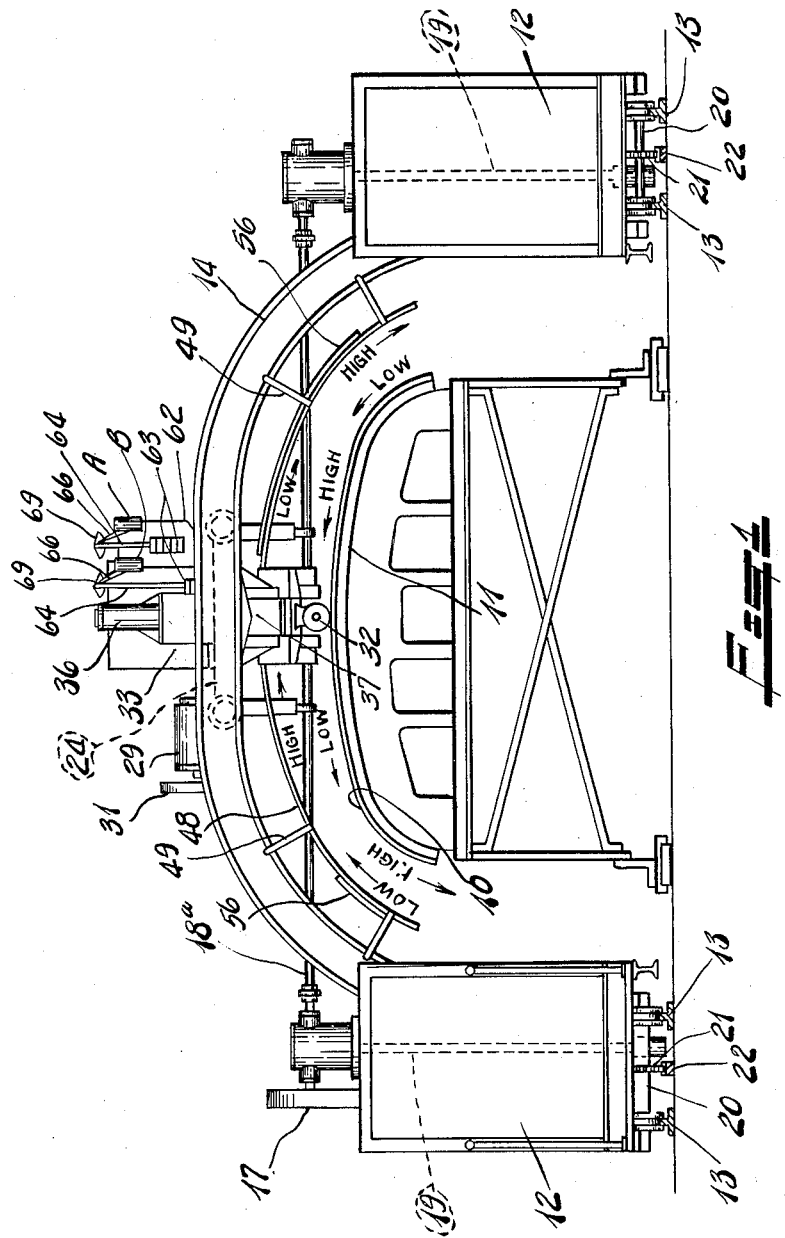
INVENTORS
Carl Lorenz. and
BY Clyde F. Kaunitz.
Frank C. Korman.
ATTORNEY.

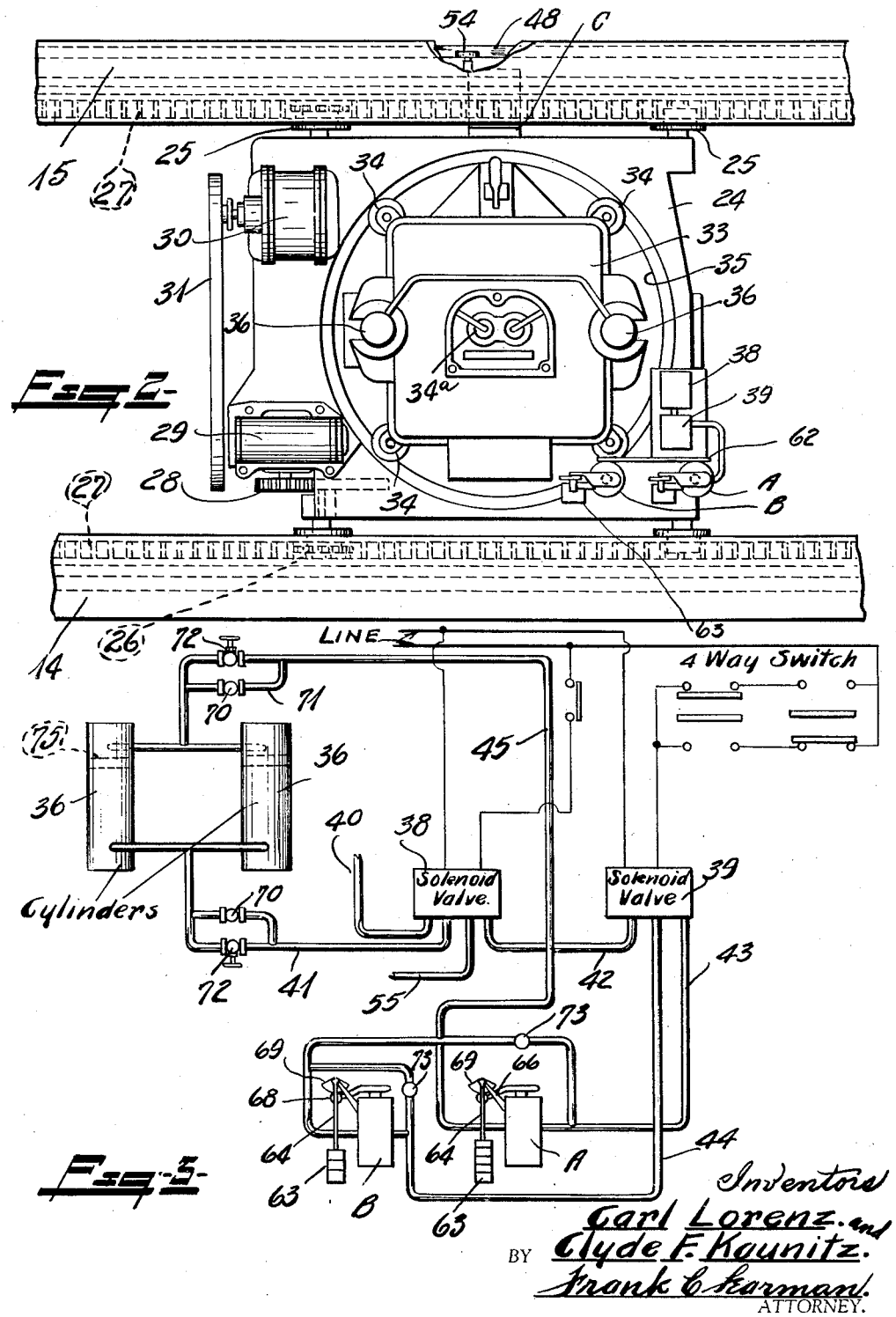

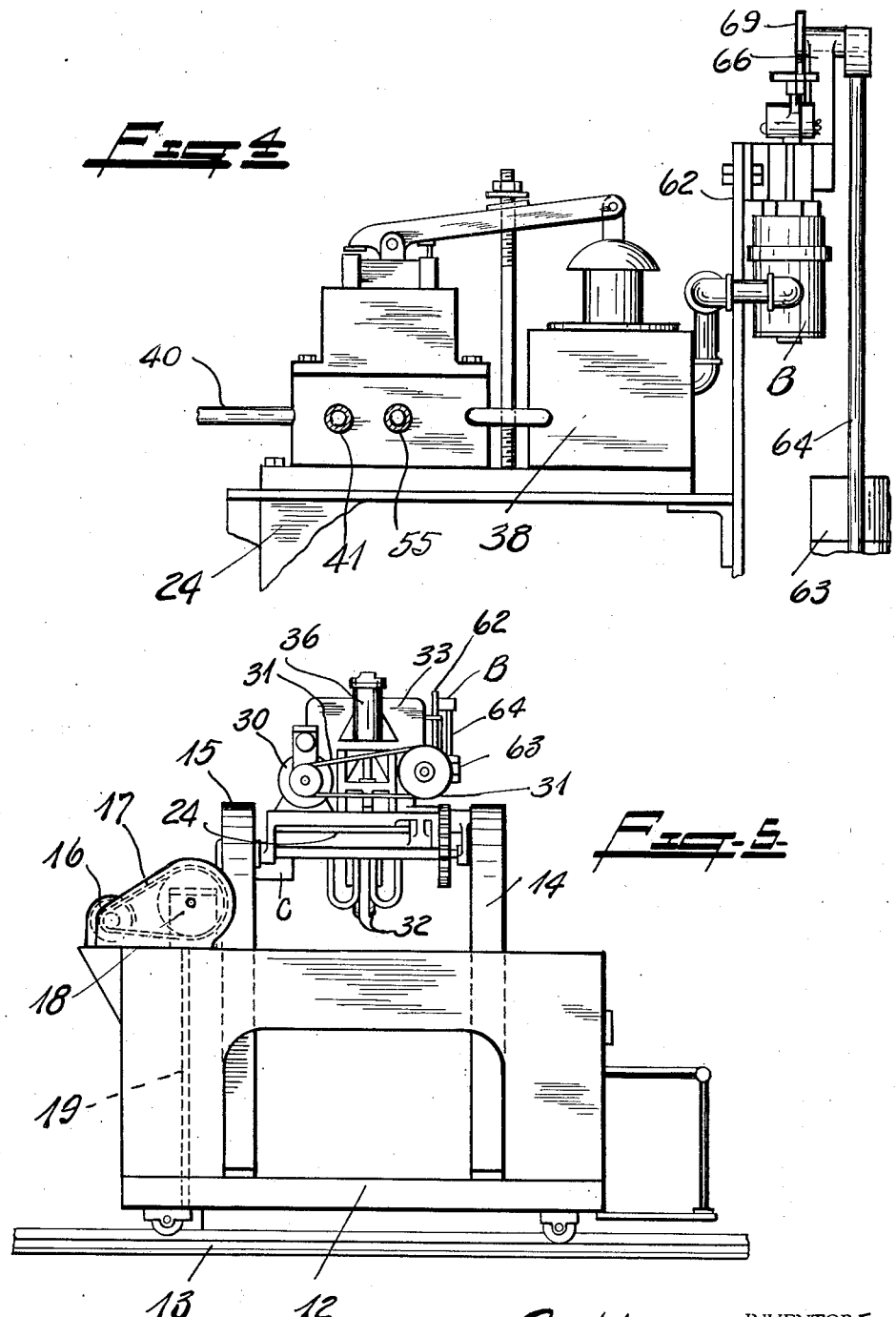

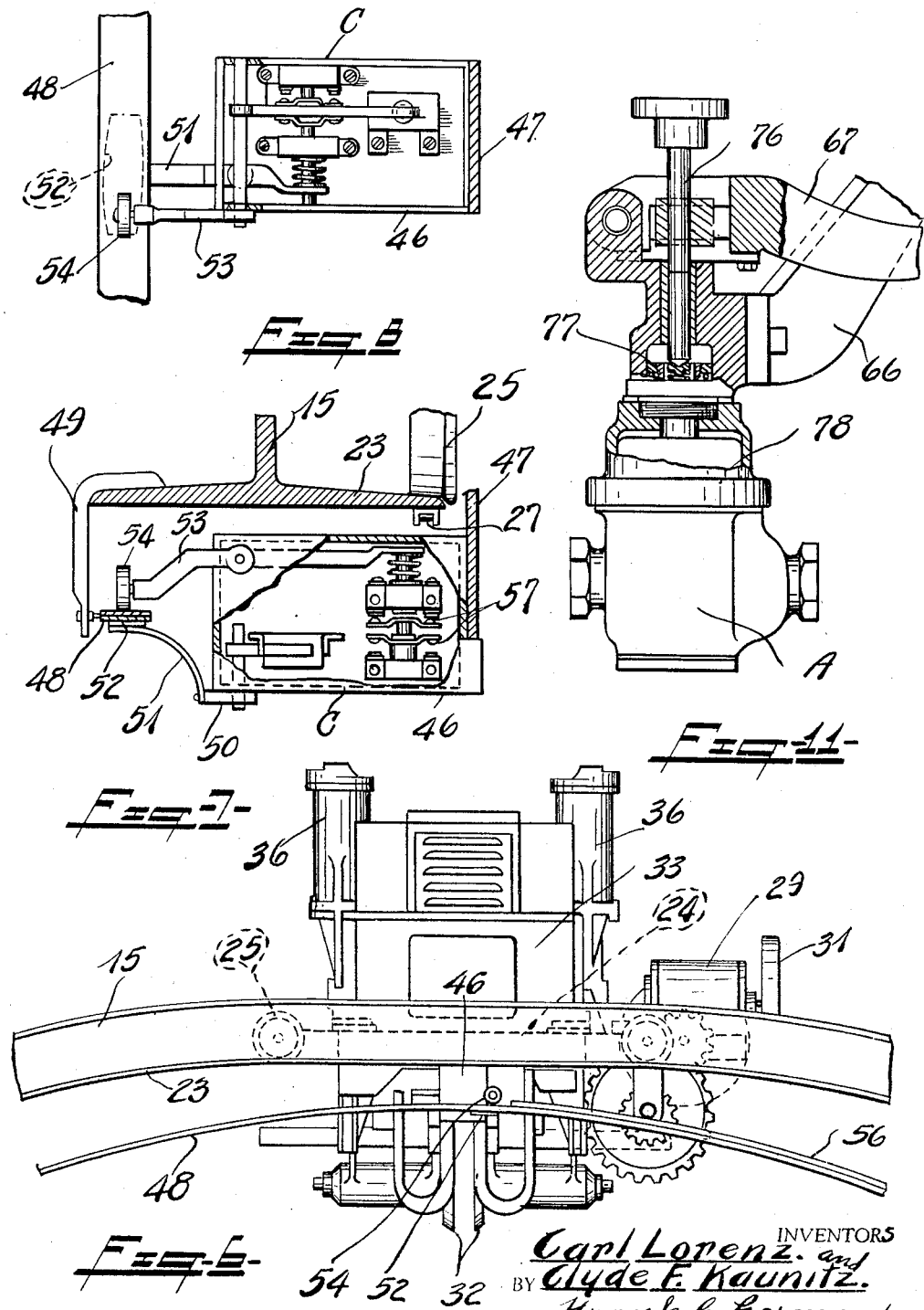

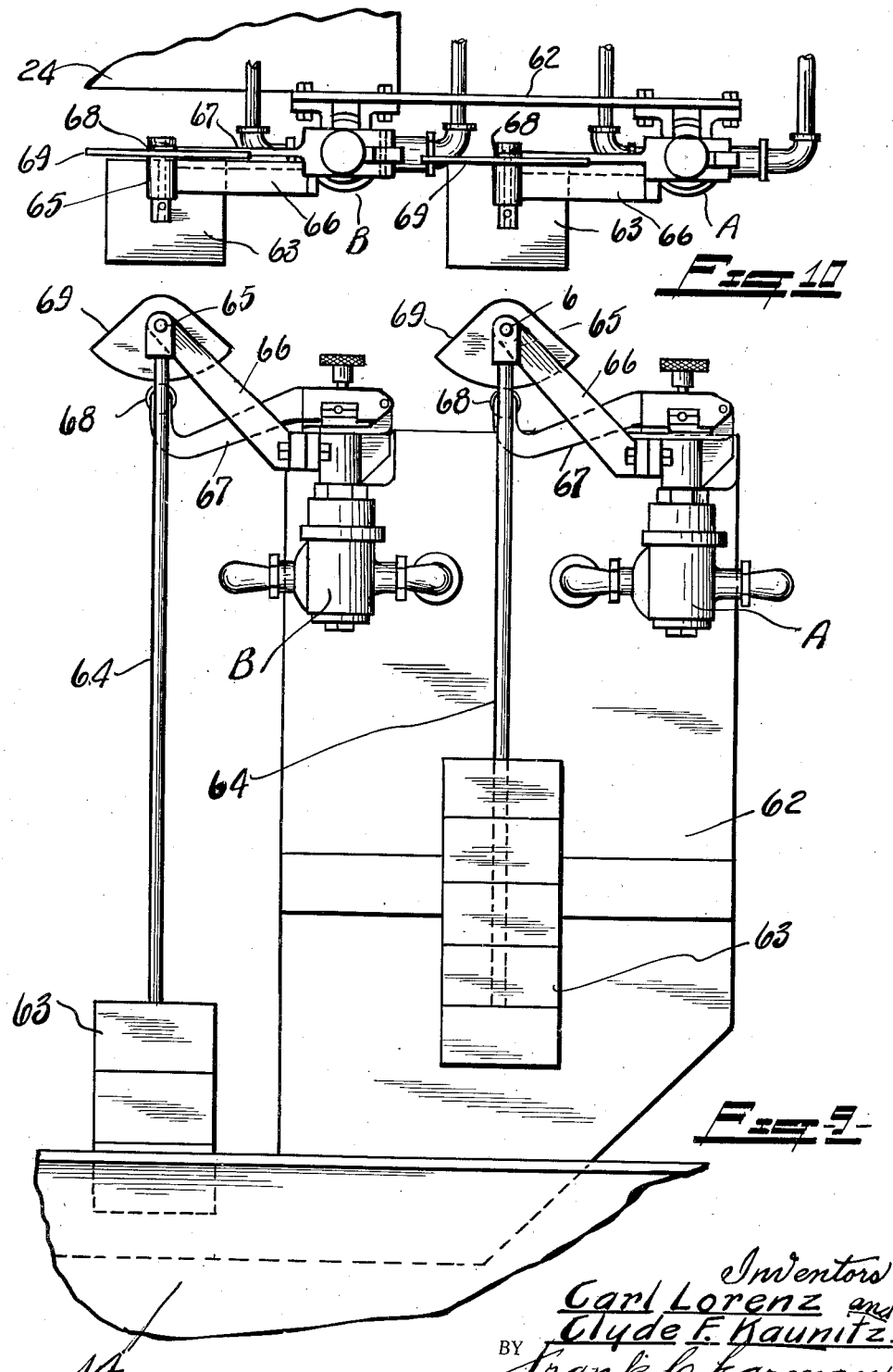

Patented Mar. 28, 1939

2,152,596

UNITED STATES PATENT OFFICE 2,152,596

WELDING APPARATUS

Carl Lorenz, Chicago, Ill., and Clyde F. Kaunitz, Bay City, Mich.

Application November 8, 1937, Serial No. 173,300

20 Claims. (Cl. 219—4)

The invention relates to welding apparatus, of the type shown in the joint co-pending application of Harry S. Boles and Howard C. Cogan, Serial No. 143,986, filed the 21st day of May, 1937, and particularly to mechanism in connection therewith to vary the pressure on the welding elements when the traversing carriage and head occupies different positions on the gantry arch beams in relation to the work.

One of the objects of the invention is to provide gravity actuated regulators controlling the pressure in the air cylinders whereby the pressure on the electrodes will remain constant regardless of the position of the welding unit on the gantry.

A further object is to provide air regulators for regulating the air pressure supplied to the electrode cylinders for varying the pressure on the electrodes, according to their position in relation to the work.

A further object is to provide means whereby air will be supplied to the electrode cylinders at predetermined zones of welding operation.

A further object is to provide the traversing carriage with switch means carried by the gantry and carriage whereby the air cylinders controlling the electrodes will be supplied with air for welding operation at predetermined positions in their movement on the traveling gantry.

A further object is to provide solenoid valves in the air supply line leading to the electrode control cylinders for controlling the volume of air supplied to the cylinders, according to the direction of movement of the welding head carrier.

A further object is to provide air pressure regulating means in the air pressure line and controlled according to the position of the carriage with relation to the work, whereby either pressure regulator will be rendered operative at predetermined positions.

A further object is to provide gravity control means in connection with the high and low pressure regulators for allowing the operation of either of them.

A further object is to provide the air regulators with pivoted control arms terminating in engagement with rockable weight control cams, which when rocked move the levers for varying the amount of pressure allowed to pass through the high or low air regulator, according to the position of the carriage on the gantry in relation to the work.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Fig. 1 is a view in elevation of the welding apparatus showing the same in position for operation.

Fig. 2 is a top plan view of the carriage and welding head and adjacent parts of the gantry beams.

Fig. 3 is a diagrammatic view of the switch, electrode cylinders, solenoid valves and air regulators in connection with the air lines.

Fig. 4 is a side elevation of the air regulators showing the same in connection with the solenoid valves and a portion of the carriage.

Fig. 5 is a side elevation of the gantry.

Fig. 6 is an enlarged side elevation of the electrode head, carriage and portions of the gantry.

Fig. 7 is a top plan view of the control switch, and a portion of the switch control track.

Fig. 8 is a side elevation of the control switch showing adjacent parts in section.

Fig. 9 is an enlarged view in elevation of the air regulators.

Fig. 10 is a top plan view of the air regulators.

Fig. 11 is a vertical, longitudinal, sectional view through one of the air regulators.

In welding the roofs of railroad cars and other equipment having an irregular work contour or surface, it is necessary to provide automatic pressure regulating means in order to maintain uniform pressure under all conditions of work. This change in pressure requirement is primarily due to the fact that the path of travel of the welding unit is not always symmetrical with the work contour, and is further due to the different positions the welding unit assembly assumes, so that the force of gravity must also be considered; and we have, therefore, perfected a simple and practical pressure regulating means, which automatically controls the air pressure in the cylinders, so that uniform welding pressure is maintained at all times regardless of the position of the welding unit with relation to the work, or the path of travel of the welding unit with relation to the work contour.

Referring now to the drawings, the numeral 10 designates a metallic car top formed from a plurality of plates, the adjacent edges of which are to be welded together. These edges run transversely and longitudinally, and the car top is supported on a form 11, which of course, varies according to the work required.

The gantry is specifically set forth in the copending application, identified above, however, it comprises cars 12 disposed at opposite sides of the work, and on tracks 13. The cars 12 are connected together by the arch shaped gantry beams 14 and 15, thereby forming a rigid, portable unit. The gantry as a whole is moved longitudinally over the work by means of the motor 16 driven through means of a belt 17, gear mechanism 18, and vertical shafts 19. The gear mechanisms are cross connected through the shafts 18a. Each shaft 19 terminates in driving mechanism to the car shafts 20, which in turn have gear drive connections 21 with toothed racks 22; therefore, it will be seen that the gantry as a whole will move over the work longitudinally.

Mounted on the gantry arch beams 14 and 15, and on the inner flanges 23 thereof is a carriage 24, which is provided with flanged wheels 25. The carriage 24 is traversed over the arch by means of gears 26, which mesh with racks 27 carried by the flanges 23 of the gantry arch beams. Gears 26 have a gear train connection 28 with a gear mechanism 29 within a housing and which gear mechanism is driven from the motor 30 through the belt drive 31. This mechanism is also set forth in the application above referred to, and it will be understood that the carriage can be moved transversely of the work for welding the transverse seams, and longitudinally of the work for welding longitudinal seams.

When the transverse seams are welded the welding wheels 32 are turned in one direction, and when the longitudinal seams are welded they are in a right angle direction, for instance as shown in Fig. 6 of the drawings. The welding wheels or electrodes are carried by a rotatable head 33 having a flanged wheel mounting 34 on an annular rib 35 of the carriage 24; therefore, it will be seen that it can be easily rotated for use.

The electrode head 33 is provided with a heat regulator 34a, and the welding wheels or electrodes 32 are forced downwardly by air pressure supplied to air cylinders 36 on opposite sides of the head 33, the arms 37 of which move downwardly when pressure is supplied to the cylinders, and upwardly when pressure is relieved. This pressure is necessary for giving the proper pressure of the welding wheels or electrodes on the work and must remain constant regardless of the work contour.

Due to the direction of travel and the different positions the welding unit assumes with relation to the work in the course of the welding operation, it has been found necessary to provide automatic pressure regulating means to provide for changes in pressure requirements. This change in pressure is secured through two independent regulators A and B respectively, positioned vertically with respect to the carriage, centrally disposed in the gantry, and as but one regulator is in operation at a time, suitable means must be provided for effecting the change from one regulator to the other, which means comprises a solenoid operated switch C as will be presently described.

The supply of air to the cylinders 36 is controlled by solenoid valves 38 and 39, which control the flow of air (which is connected to a suitable source of supply) from the supply line 40 through the solenoid valves and through the pipe 41 leading to the cylinders, the pipe 42 cross connecting the solenoid valves, and pipes 43 and 44, respectively, lead to the low pressure air regulator A and high pressure regulator B, respectively, both of which are in turn in the air circuit with the air cylinders 36, through the pipe 45.

As previously stated, two independent pressure regulators are employed, and but one regulator is in operation at a time, the regulator A being in operation on the low pressure range, while regulator B is in operation on the high pressure range, change from one regulator to the other being accomplished by means of the four way switch C (see Figs. 3, 7 and 8 of the drawings), which is rigidly mounted on the welding head carriage, and which includes a casing 46 carried by a plate 47, said plate being secured to the side of the carriage 24 in any suitable manner; therefore, it will be seen that the switch is disposed beneath the gantry beam 15.

A switch arch or cam 48 is located beneath the beam 15, and is supported by hanger brackets 49 carried by said beam, the switch C having a rolling and sliding contact therewith. A horizontally movable arm 50 extends from the switch and a resilient arm 51 is secured thereto and includes a shoe 52 which bears against and slides on the underside of the arch beam or cam 48 and forms the sliding contact above referred to, and when the welding carriage reverses its direction of travel, the contact is also reversed for energizing the other solenoid on the return movement of the carriage, thus changing the position of the contact on the switch; a rock lever 53 also extends from the side of the switch and has a wheel 54 mounted on the outer end thereof, said wheel having traction engagement with the switch arch 48 as clearly shown in Figs. 7 and 8 of the drawings, and forming the rolling contact referred to.

Normally the welding rolls are in raised position, the solenoid valve 38 allowing pressure to flow into the bottom of the cylinders 36 from the supply line 40, thence through valve 38 and line 41 to the cylinders 36. Now, assuming the welding unit to be at one end or the other of the welding stroke, the operator actuates the control push button (not shown) and valve 38 is actuated to exhaust air from the lower end of cylinders through the exhaust line 55, and air then flows through pipe 42, through valve 39 and thence through the pipe line 43 to regulating valve A and the welding rolls are thus forced downwardly under the predetermined pressure of this valve setting.

The switch arch or cam 48, at spaced points where it is desired to apply additional pressure or reduce the pressure, is provided with raised portions 56 over which the wheel 54 rides for shifting the switch points 57 to energize or deenergize solenoid valve 39. The switch and solenoid which control the cylinder operating valve are in the same circuit, so that any change in the contact part of the switch makes use of either regulator A or B depending upon the direction in which the welding head is traveling.

In the operation of the seam welder, it is necessary to vary the air pressure in the cylinders 36 that hold the welding electrodes on the work. This change in pressure requirement is due to the different positions the welding head assumes on the arch beam in the course of the welding operation, and is accomplished through the independent pressure regulators A and B, which are mounted on the plate 62 provided on the carriage 24, these pressure regulators being controlled by pendulum weights 63, the rods 64 of which extend upwardly and are pivotally connected at 65 to brackets 66 carried by the regulators.

Regulator A is a low pressure regulator, while regulator B is a high pressure regulator; however, they are controlled by levers 67, which terminate in upwardly extending bearing wheels 68 which engage the cams 69 carried by and rockable with the shaft 65; therefore, it will be seen that as the carriage moves in the gantry and assumes a position with relation to the work the regulators will be cut into operation with the air circuit at predetermined times for reducing or increasing the air pressure as desired.

To permit air to be exhausted from the top of the cylinders when the welding wheels are raised, we provide a check valve 70 in the by-pass line 71, and a throttle valve 72 in the main line 45 so that easy regulation is provided, a similar check and throttle valve respectively being provided in the air line 41 and for a similar purpose.

Inasmuch as the air flows through the regulators in one direction only, we provide check valves 73 in the lines 43 and 44 to permit air to be exhausted therefrom.

Referring to Fig. 1, the arrows and legends thereon, it will be seen that the necessity for high or low pressure regulating of the cylinders 36 takes place at predetermined positions according to the direction of travel of the carriage and the inclination thereof, and the raised portions 56 may be positioned according to the curvature or contour of the work for actuating the wheel 54, and rocking the lever 53 upwardly for controlling the switch, and consequently, the regulator. The other regulator, of course, is controlled by the reverse movement of the carriage and its solenoid controlled valve.

The cylinders 36 have pistons 75 therein, which are forced downwardly and upwardly during the movement of the electrodes over the work, and the pressure on the electrodes will vary according to the regulated amount of air supplied to the cylinders 36 from the high and low pressure air regulators A and B, which can be changed or varied by varying the shape of the regulator cams. The air regulators are of conventional design and have plunger rods 76, which are moved downwardly against a spring actuated head 77 for controlling a diaphragm valve 78, which in turn controls the supply of air to the cylinders 36 and the exhaust of air from the system. It is to be understood that applicants do not limit themselves to any particular type of air regulator.

It is obvious that as the electrode rolls travel over the contour of the work the carriage travel on the beam is not always symmetrical with the work contour, therefore, the pistons 75 have a differential movement in their respective cylinders 36, and in order to maintain a constant pressure as a piston moves up, air is exhausted through one of the pendulum control regulator valves, and as the pistons move downwardly in their respective cylinders, a regulated pressure is supplied through the other pendulum control regulator and valve. In this manner it is possible to maintain a constant pressure throughout the welding stroke regardless of the angle the heads are in when welding, as the pressure overcomes the various forces of gravity at these angular positions during the welding operation. All of this may further be varied through shaping of the regulator control cam.

From the above it will be seen that regulating means is provided in connection with a traversing carriage of an electric welding machine whereby the operation of the machine is controlled as far as the electrodes are concerned, and the amount of pressure applied to the regulators is controlled by air regulating valves, which are in turn controlled by the movement of the carriage to predetermined positions during a welding operation.

What we claim is:

1. The combination with a traversing carriage of a welding machine, electrodes carried by said carriage and movable towards and away from the work, means for moving the electrodes towards the work under pressure, of means so constructed and arranged and controlled by the movement of the carriage and cooperating with the last named means for varying the pressure of the electrodes on the work as the carriage moves over the work.

2. The combination with a traversing carriage of a welding machine, electrodes carried by said carriage and movable towards and away from the work, means for moving the electrodes towards the work under pressure, said means comprising air cylinders, means for supplying air pressure to the cylinders, and means controlled by the movement of the carriage for varying the amount of air pressure within the cylinders thereby varying the pressure of the electrodes on the work.

3. The combination with a traversing carriage of a welding machine, electrodes carried by said carriage and movable towards and away from the work, a trackway supporting said carriage, electrodes carried by said carriage, air cylinders controlling the pressure of the electrodes on the work, of means carried by the trackway and cooperating with means carried by the carriage for varying the pressure in the air cylinders and of the electrodes on the work at predetermined positions.

4. The combination with a traversing carriage of a welding machine, electrodes carried by said carriage and movable towards and away from the work, a supporting trackway for said carriage, electrodes carried by the carriage and movable over the work, pressure cylinders carried by the carriage and controlling pressure of the electrodes on the work, an air circuit to said cylinders, valve means in the air circuit and controlling the supply of air to the cylinders, of means carried by the trackway and carriage whereby upon movement of the carriage to predetermined position the pressure of the cylinders on the electrodes will be varied.

5. The combination with a welding machine comprising supporting trackways adjacent the work, a traversing carriage on said trackway, electrodes carried by said carriage, means for applying various pressures on the electrodes against the work, of means controlled by the movement of the carriage for automatically varying the pressure of the electrodes on the work at predetermined positions.

6. A device as set forth in claim 5 wherein the means for varying the pressure at predetermined positions comprises an auxiliary cam trackway carried by the trackway, and means carried by the carriage and cooperating with the cam trackway whereby the pressure on the electrodes at predetermined positions will be varied.

7. A device as set forth in claim 5 wherein the varying of the pressure of the electrodes on the work is controlled from a cam member carried by the carriage trackway and the pressure further controlled by gravity actuated air regulators.

8. The combination with a welding machine comprising a traversing carriage mounted on a trackway, electrodes carried by said carriage, air cylinders for applying pressure on said electrodes, an air circuit in connection with the cylinders, solenoid valves controlled by the movement of the carriage for applying pressure to the electrodes at predetermined positions of the carriage and gravity actuated high and low pressure regulators carried by the carriage and forming means whereby upon various inclinations and movements of the carriage the pressure in the cylinders may be varied at predetermined positions.

9. The combination with a welding machine comprising a traversing carriage mounted on a trackway, electrodes carried by said carriage, air cylinders for applying pressure on said electrodes, an air circuit in connection with the cylinders and with a source of air supply, solenoid valves controlling the flow of air through the air circuit, said solenoid valves being controlled by the movement of the carriage for applying pressure to the electrodes at predetermined positions of the carriage, means carried by the trackway and cooperating with means on the carriage for controlling the solenoid valves at predetermined positions and automatically controlled high and low pressure regulators in the air circuit and actuated by movement of the carriage whereby high and low pressures may be applied to the air cylinders according to the position of the carriage.

10. A device as set forth in claim 9 wherein the air regulators comprise cylinders, operating levers carried by the cylinders and gravity actuated cam members supported by the cylinders and cooperating with the levers for actuating the regulators.

11. A device as set forth in claim 9 wherein the solenoid actuating means comprises a switch carried by the carriage, a cam trackway carried by the carriage trackway, actuating arms carried by the switch and cooperating with the cam trackway for actuation upon movement of the carriage, said solenoids being in circuit with said switch means.

12. The combination with a traversing welding carriage mounted on a traversing welding machine arch trackway, air controled electrodes carried by the carriage, an air circuit controlling the movement of the electrodes towards and away from the work, solenoid valves for controlling the air circuit, of a switch carried by the carriage in circuit with the solenoid valves, of means for controlling the operation of said switch at predetermined positions, said means comprising pivoted arms carried by the switch, a cam-way carried by the carriage trackway, said switch arms cooperating with said cam-way, whereby at predetermined positions the pressure on the electrodes will be applied.

13. A device as set forth in claim 12 including high and low pressure regulators in the air circuit, said regulators being actuated at predetermined positions.

14. A device as set forth in claim 12 wherein the carriage trackway is arcuately shaped and high and low air pressure regulators in the air circuit, said high and low air pressure regulators being controlled at predetermined positions by the position of the carriage on the arcuate trackway.

15. A device as set forth in claim 12 including high and low pressure regulators in the air circuit, said pressure regulators having gravity actuating means whereby the regulators will be controlled by the inclination of the carriage on the trackway.

16. The combination with a traversing welding machine having pressure actuated electrodes, of means whereby pressure is applied on the electrodes at predetermined positions and means whereby high or low pressure is applied on the electrodes at predetermined positions.

17. A device as set forth in claim 16 wherein the means for applying high or low pressure to the electrodes at predetermined positions comprises gravity actuated regulators in connection with the means for applying pressure to the electrodes.

18. The combination with an arcuately movable welding carriage, said carriage being movable on the arcuate tracks arching arcuate work substantially conforming to the shape of the tracks, pressure controlled electrodes carried by the carriage and forced against the work, of means controlled by the carriage so arranged and constructed that as the electrodes and carriage move towards the ends of their movement, increasing pressure is applied to the electrodes, and when they move away from the ends of their movement the pressure on the electrodes is reduced.

19. The combination with a traversing welding machine carriage arcuately movable on arcuate trackways above arcuately shaped work, pressure controlled electrodes carried by the carriage and movable over the arcuate work transversely thereof, of means carried by the carriage and so constructed and arranged that when the carriage and electrodes approach the ends of their movement a high pressure will be applied to the electrodes, and when the carriage moves away from the ends of its movement a reduced pressure will be applied.

20. A device as set forth in claim 19 wherein the path of travel of the carriage is substantially concentric with the curvature of the work.

CARL LORENZ.
CLYDE F. KAUNITZ.